United States Patent
Marvel et al.

(10) Patent No.: US 6,831,990 B2
(45) Date of Patent: Dec. 14, 2004

(54) SYSTEM AND METHOD FOR IMAGE TAMPER DETECTION VIA THUMBNAIL HIDING

(75) Inventors: Lisa M. Marvel, Churchville, MD (US); George W. Hartwig, Jr., Havre De Grace, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 898 days.

(21) Appl. No.: 09/751,926

(22) Filed: Jan. 2, 2001

(65) Prior Publication Data

US 2004/0017925 A1 Jan. 29, 2004

(51) Int. Cl.[7] ................................................. H04K 1/00
(52) U.S. Cl. ..................................................... 382/100
(58) Field of Search ................................ 382/100, 232; 715/514, 763, 530; 345/634, 763, 838, 859; 375/240; 713/176; 370/527, 529

(56) References Cited

U.S. PATENT DOCUMENTS

| | | | | | |
|---|---|---|---|---|---|
| 5,761,686 | A | * | 6/1998 | Bloomberg | 715/529 |
| 5,765,176 | A | * | 6/1998 | Bloomberg | 715/514 |
| 6,091,771 | A | * | 7/2000 | Seeley et al. | 375/240 |
| 6,583,799 | B1 | * | 6/2003 | Manolis et al. | 345/838 |

* cited by examiner

*Primary Examiner*—Jose L. Couso
(74) *Attorney, Agent, or Firm*—Paul S. Clohan, Jr.; Stephen M. Bloor

(57) ABSTRACT

A semi-fragile image tamper detection system and method based on thumbnail hiding and which signifies the image areas in which tampering has occurred, is provided. A thumbnail is defined as a low-resolution version of an entire image or the significant features of an entire image. Thumbnail hiding is chosen to be resilient to effects of both image compression and low levels of transmission channel noise. The thumbnail computation and embedding techniques are chosen such that the resultant marked image corresponds in size and dynamic range to the original image.

16 Claims, 9 Drawing Sheets

SYSTEM AND METHOD FOR IMAGE TAMPER DETECTION VIA THUMBNAIL HIDING

BACKGROUND OF THE INVENTION

1. Field of the Invention

The present invention relates to the field of digital image tamper detection. More particularly, the invention deals with a system and method of digital image tamper detection that can effectively detect image manipulations and their locations within the image but is tolerant of the effects of low-level image compression and additive channel noise, i.e., a semi-fragile technique.

2. Description of Related Art

Image tamper detection techniques are well known in the art as a method used to detect modification of an image from its original state.

A range of tamper detection techniques has been described, varying in degree from fragile techniques, that can detect the most minute alterations of an image, to more robust techniques, that are tolerant of significant modifications of an image. Semi-fragile techniques lie between these extremes and are capable of detecting significant modifications while, at the same time, tolerating minor alterations, such as those induced by low levels of lossy compression or channel noise.

Approaches to semi-fragile tamper detection have been proposed in the literature, all of which employ some variation of an extracted image signature. The concept of semi-fragile tamper detection is described by M. Schneider and S. Chang, Proceedings of the IEEE International Conference on Image Processing, pages 227–230, Lausanne, Switzerland, September 1996. Schneider and Chang proposed a semi-fragile technique of tamper detection that extracts a content-based signature of the image as intensity histograms from blocks of image pixels. This content-based signature is then embedded within the original image using any one of a variety of known watermarking techniques. This technique is robust to a certain level of lossy image compression.

Another scheme for semi-fragile tamper detection is described by L. Xie and G. Arce in "A Watermark for Digital Images," Proceedings of the IEEE International Conference on Image Processing, Chicago, Ill., October 1998. Xie and Arce describe a scheme of embedding edge information extracted from the original image within the low-order coefficients of a wavelet transform.

S. Bhattacharjee and M. Kutter, in "Compression Tolerant Image Authentication," Proceedings of the IEEE International Conference on Image Processing, Chicago, Ill., October 1998, describe another compression tolerant tamper-detection scheme. Their scheme extracts perceptually interesting feature points that are not embedded within the image but maintained separately.

In M. Wu and B. Liu, "Watermarking for Image Authentication," Proceedings of the IEEE International Conference on Image Processing, Chicago, Ill., October 1998, a technique is presented that invisibly embeds within the original image a visually meaningful watermark, along with a set of simple features, by altering coefficients that are indexed into a look-up table of frequency domain coefficients.

In addition to approaches that are described in the literature, several patents teach devices and methods for image tamper detection and/or authentication. An image tamper detection and/or authentication process is disclosed by Ward, in U.S. Pat. No. 5,760,386, in which the image of the holder of an identification document is stored, in highly compressed form, in a magnetic medium dispersed invisibly within a visible print of the holder that is part of the document or within the body of the identification document itself. When the document is scanned magnetically at the place where identification is being authenticated, this image is decompressed and displayed in order to confirm that the holder of the document is the person shown and that the document has not been tampered with. The entire content of the original image is used in Ward's process. This tamper detection approach is not restricted to certain acquisition devices.

Shimizu, et al., U.S. Pat. No. 6,005,936, disclose a digital camera device and method for embedding an extracted image signature in a digital image. In response to the digital signal of the image, a digital camera having a region-dividing unit divides the digital image into first and second regions. Authentication information is generated in the form of a hash value from data in the first region and this information is then encrypted using a secret key, which differs for each camera and is held within the camera itself. The encrypted hash value is then embedded in the second image region, and the first and second regions are then combined to form a combined image. An alteration detecting system is also disclosed in which an authenticator uses a public key corresponding to the camera's secret key to decrypt the hash value. The original division of the image is detected and the hash value is calculated anew and compared with the decrypted hash value to accomplish authentication of the image. This approach uses only part of the original image for authentication, i.e., the first image region, and is restricted to a particular image acquisition device, i.e., specially equipped digital cameras.

Friedman, U.S. Pat. No. 5,499,294, discloses a digital camera equipped with a processor for generating a digital signature by hashing an image file using a predetermined algorithm and encrypting the hashed file with a private key stored in the camera's processor. The encrypted image may be decrypted using a public key that is stored in the camera's housing. Both the image file and the digital signature are stored individually (not embedded one within the other) but in such a way that they will be available together. For authentication purposes only, the public key is used to decrypt the digital signature for comparison with a newly created hash of the entire image. This tamper detection approach is restricted to certain acquisition devices, i.e., specially equipped digital cameras. It is also possible for the digital signature and the original image file to be separated from one another by a malicious attacker intent on defeating this security technique.

Schipper, et al., U.S. Pat. No. 5,987,136, disclose an apparatus for producing a self-authenticating visual image of a selected view, using a digital image forming means such as a digital camera, together with a position determining system that provides position information. The position information is incorporated in the digital image by altering pixel bit values in a selected authentication pattern of the pixel array associated with the digital image. A set of polygons is used as the authentication pattern, wherein each polygon contains at least one pixel from the selected subset of the pixel array. The authentication pattern is represented by a key or ordered sequence of keys and may be encrypted and either stored with or as a part of the digital image. This tamper detection approach is restricted to certain acquisition devices, i.e., specially equipped digital cameras. If the authentication pattern is stored separately from the image, there is the possibility of its destruction by a malicious attacker.

Squilla, et al., U.S. Pat. No. 5,898,779, disclose a public key encryption system for authenticating an image using a digital camera which has a private key embedded in it that is unique to the digital camera. A known public key, uniquely based on the private key, is used to decrypt digital image data encrypted with the private key in order to establish authenticity of an image. A digital signature is produced by the camera using one or more patterns taken from an active area of the image and input to a predetermined hash function. The hashed output is then encrypted employing the embedded private key. The digital signature and location of the active area are stored together with the image but not within the image. This tamper detection approach is restricted to certain acquisition devices, i.e., specially equipped digital cameras, and is subject to destruction of both the digital signature and the location of the active area by a malicious attacker.

Murphy, et al., U.S. Pat. No. 5,799,082, disclose an apparatus for capturing and authenticating a visual image of a selected view, using a digital image forming means, such as a digital camera, together with a position determining system that provides position information. Any suitable overlay pattern of a selected subset of the array of image pixels may be used to incorporate the position information in the digital image by altering the pixels lying within this pattern. The position information may be encrypted, using an encryption key based on position information, and may be stored as part of the digital image. Optionally, position information includes the distance from the digital camera to the selected object in the selected view. Murphy's tamper detection approach is restricted to certain image acquisition devices, i.e., specially equipped digital cameras, and the authentication information is susceptible to destruction by a malicious attacker if it is stored separately and not embedded in the image.

Tamper detection techniques known in the art have various vulnerabilities and limitations. In several techniques the tamper detection information is developed using only a part of the image and if a different part of the image is modified, this approach cannot detect the tampering. In other techniques the tamper detection information is easily separated from the image because it is stored with but separate from the image. Many known techniques are restricted to certain acquisition devices. Many known techniques cannot indicate where in the image the detected tampering has occurred.

SUMMARY OF THE INVENTION

According to the present invention, there is provided a semi-fragile tamper detection system and method that overcomes the above-noted prior art shortcomings. More particularly, the semi-fragile tamper detection system and method of the present invention hides a low-resolution version of the entire original image within the original image, is acquisition device independent, and signifies the image areas in which detected tampering has occurred.

The semi-fragile tamper detection scheme of the present invention uses data hiding techniques to embed a low-resolution version of an original image within the image itself to form a marked image. A low-resolution version of an image is defined as a thumbnail of that image. Any data hiding technique can be used that is resilient to the effects of both image compression and low levels of transmission channel noise.

With proper selection of a data hiding technique, the hidden information (thumbnail) is recoverable even if the image has been compressed via low levels of image compression, e.g., JPEG, or exposed to additive transmission channel noise. Gross alterations in a transmitted marked image may then be detected by extracting the embedded thumbnail and comparing it with a newly computed thumbnail of the received marked image. If the two thumbnails are sufficiently similar, it can be concluded that no tampering has occurred and the image is authenticated. Alternatively, if the thumbnails are not sufficiently similar, it can be concluded that the image has been manipulated and a tamper alert can be issued.

An image thumbnail can be constructed in a number of ways, including, low-pass filtering followed by decimation and wavelet decomposition. Data hiding can be accomplished by a variety of data hiding techniques such as Spread Spectrum Image Steganography (SSIS).

BRIEF DESCRIPTION OF THE DRAWINGS

FIG. 5c illustrates malicious tampering of the image of FIG. 5a.

FIG. 8a illustrates the superimposition of noise on the image of FIG. 5a.

DETAILED DESCRIPTION OF THE PREFERRED EMBODIMENTS

The following embodiments of the present invention are provided for illustrative purposes only.

Figure 1:
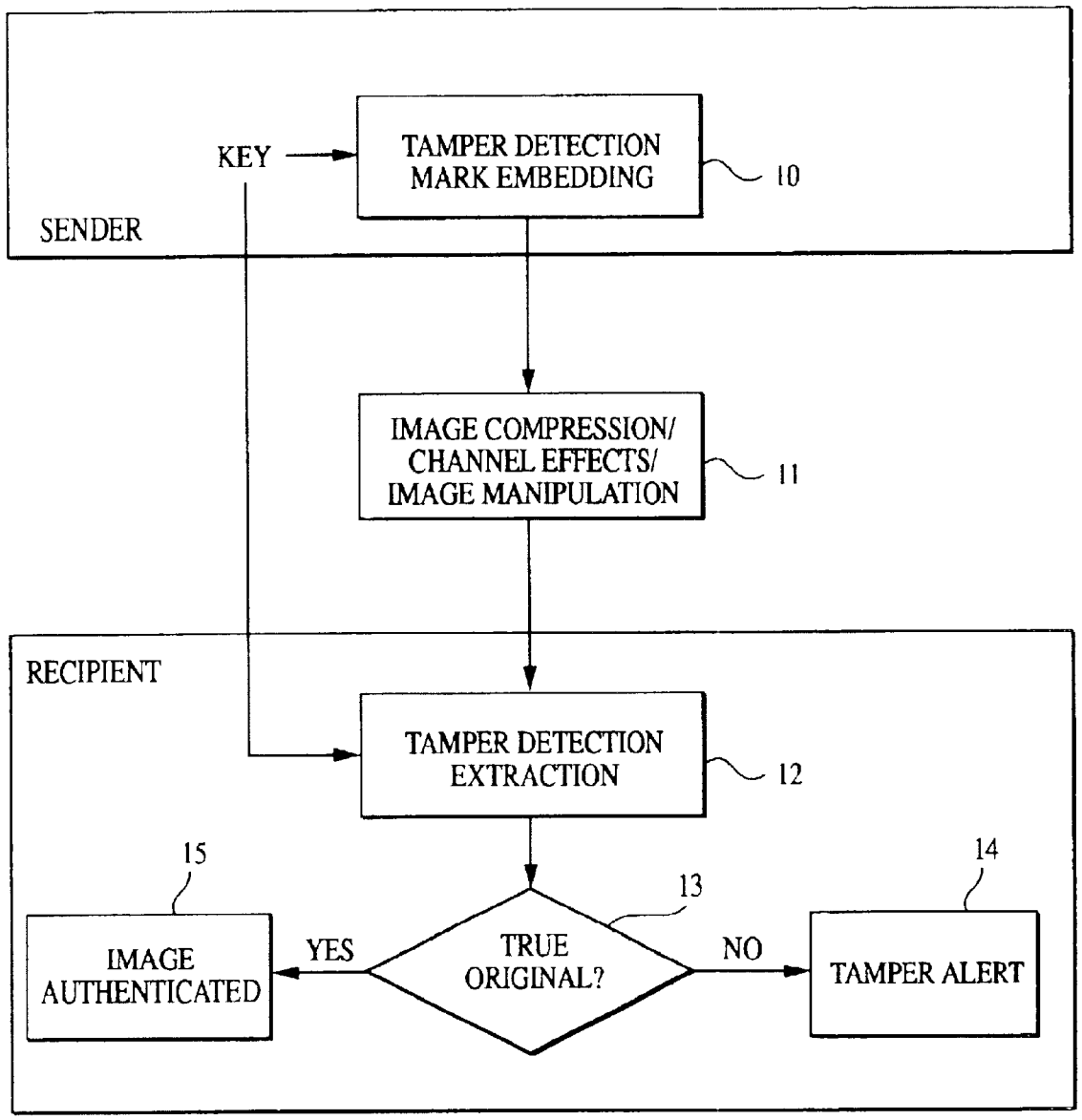
FIG. 1 is a flow chart which illustrates a general tamper detection operating scenario.

Referring now to the flow chart of FIG. 1, a general tamper detection operating scenario is illustrated. In step 10, a sender uses a tamper detection mechanism and a key to embed a tamper mark within an image. In step 11, the marked image is then compressed or exposed to additive channel noise during transmission to a recipient, thereby causing distortion in the marked image during transmission. While en route to a recipient, the image may also be intercepted by a malicious party who may employ image manipulation techniques to modify the image information. This distorted, modified, and marked image is then passed along to the recipient, who has no knowledge of the interception or manipulation. Upon receipt of this image, in step 12, the recipient extracts the tamper detection mark and uses it in step 13 to determine if the image has been altered. If altered, a tamper alert is emitted in step 14 or the image is authenticated in step 15.

Figure 2:
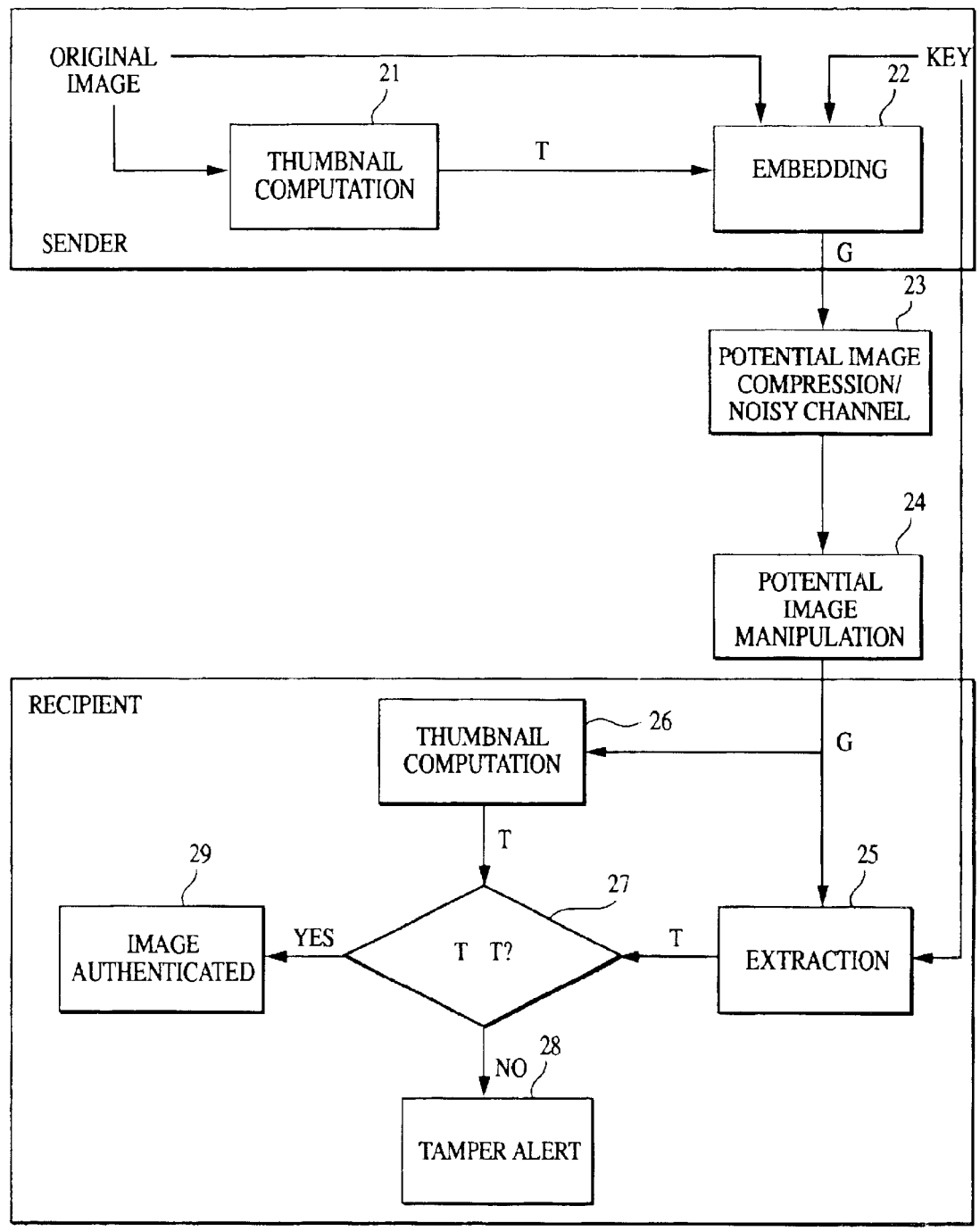
FIG. 2 is a flow chart which illustrates a tamper detection operating scenario according to the present invention.

The semi-fragile detection system and method of the present invention is illustrated in the flow chart of FIG. 2 with the primary functions of the system and method reflected in the following equations:

(1) In sub-process 21, the thumbnail of the entire original image is computed. For demonstration purposes, consider an original N×N image, I, where the thumbnail is computed as:

$$T=\{t(j):j=0, 1, \ldots, M\}, M=(N/2^n)^2.$$

This thumbnail contains the lowest order coefficients of an n-level wavelet decomposition, W, such that $$T=W(I,n).$$

The user may select n to ensure that all important image features, those for which tamper detection is desired, are visible within the thumbnail. A secondary consideration in the selection of the variable n is the payload capacity of the original image.

(2) The marked image, G, is constructed by the data hiding encoder in step 22, that embeds T into the original image governed by a key k:

$$G=\mathcal{H}(I,T,k)$$

The choice of $\mathcal{H}$ is made so that the size and dynamic range of the resultant marked image do not vary from the original image.

(3) The marked image may be exposed to various distortions, including image compression and noise from the transmission channel in process 23. Furthermore, a malicious attacker may manipulate the image in step 24. The present claimed invention detects image manipulation as tampering while neglecting effects of both modest image compression and channel noise.

(4) The marked image received by the recipient is denoted as $\hat{G}$ and is a version of G that may have been distorted and maliciously manipulated. From $\hat{G}$, the embedded thumbnail of the original image, T, is extracted in step 25:

$$T=\mathcal{H}^{-1}(\hat{G},k).$$

(5) A new thumbnail is created from the received image in step 26:

$$T=W(\hat{G},n).$$

(6) The two thumbnails are compared for similarity by taking the absolute difference of corresponding inverse wavelet transforms in step 27:

$$D=|W^{-1}(T,n)-W^{-1}(T,n)|.$$

(7) In the locations where D is large, the thumbnails are judged not sufficiently similar, it can be assumed that tampering has occurred, and a tamper alert is emitted 28. Where D is small the thumbnails are judged sufficiently similar, the effects are attributed to image compression and/or low-level channel noise and the image is authenticated in step 29. If D is approximately equal to zero, the thumbnails are deemed sufficiently similar, the image is judged not to have been altered in a significant manner, and the image is authenticated in step 29.

In one exemplary embodiment of the present invention the data hiding technique used is Spread Spectrum Image Steganography (SSIS). However, any technique can be used that meets the data hiding requirements of concealing a thumbnail in the original image so that it cannot be detected and neither the size nor the dynamic range of the original image are changed. In this exemplary embodiment, thumbnail computation is accomplished using wavelet decomposition. However, any technique can be used that meets the thumbnail requirement of creating a low resolution counterpart of the entire image.

Figure 3:
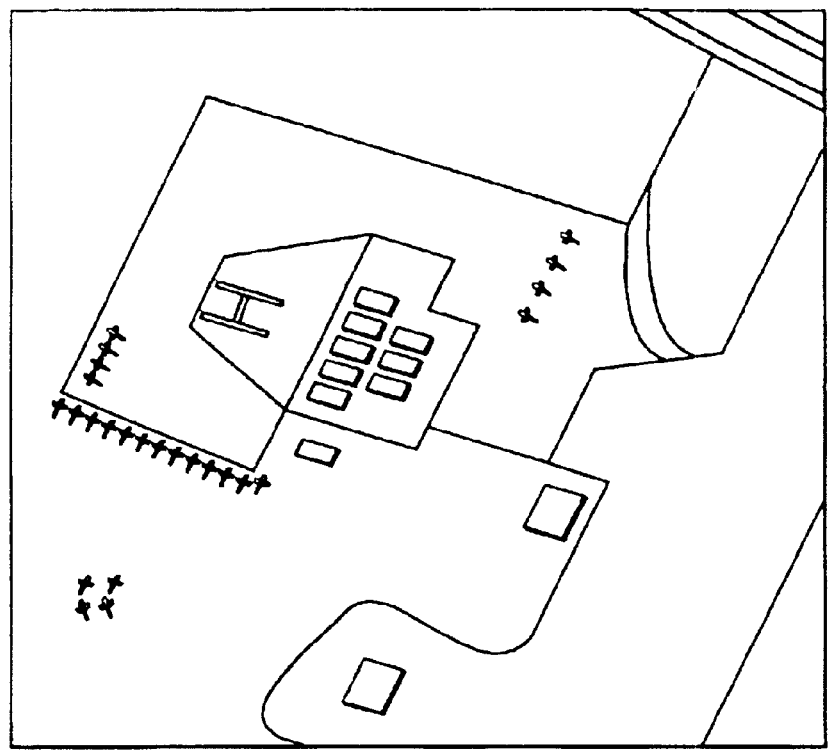
FIG. 3 illustrates a noise-free, unmodified line drawing corresponding to an image of an air field taken from space.
Figure 4:
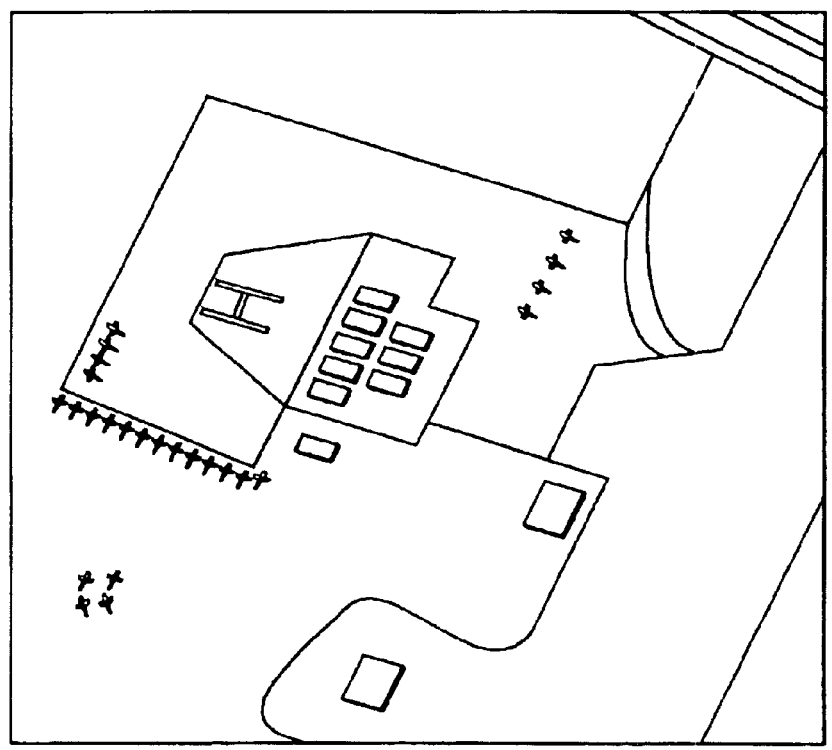
FIG. 4 illustrates a line drawing of a marked image resulting from application of the present invention to the image illustrated in FIG. 3, i.e., a thumbnail of the original image is embedded in the original image.

FIG. 3 illustrates an original image and FIG. 4 illustrates a marked image resulting from the semi-fragile system and method of the present invention applying a three-level wavelet decomposition to this original image to derive a thumbnail and then embedding this thumbnail in the original image using SSIS with a rate of 1/6 error correcting code and an embedded signal power of 60. That is, the marked image should look very much like the original image with a mean-squared error of 60 and a peak signal-to-noise ratio of 303.3 dB.

Figure 5A:
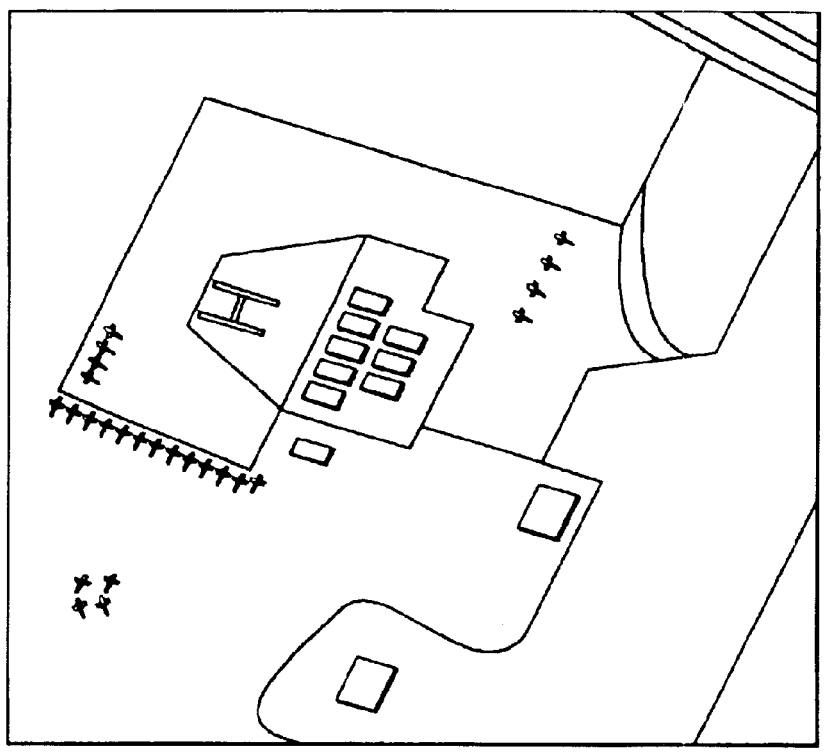
FIG. 5a illustrates the marked image of FIG. 4 compressed with JPEG compression with a quality factor of 90.
Figure 5B:
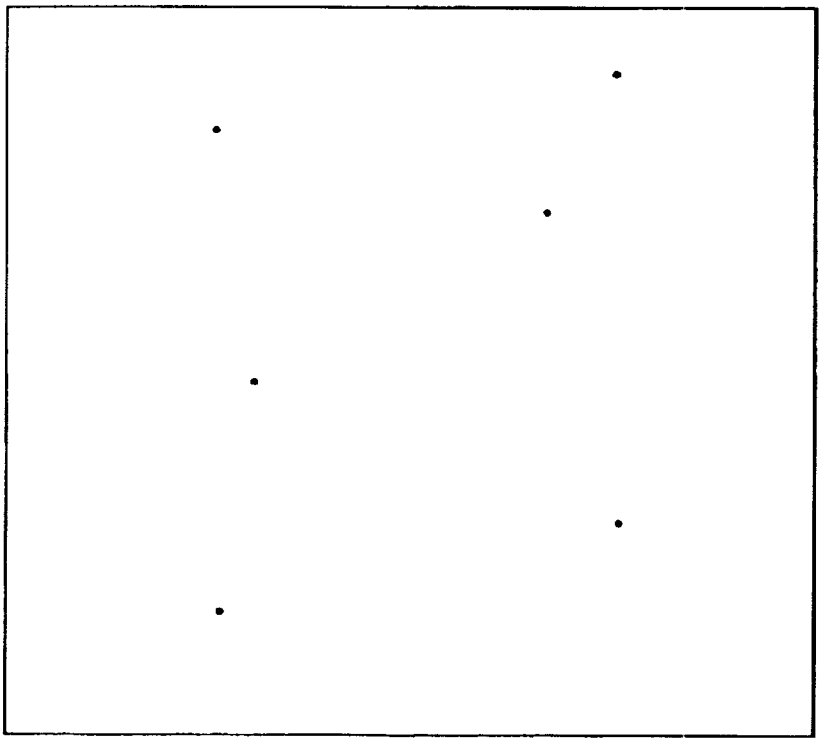
FIG. 5b illustrates the difference between a thumbnail extracted from a decompression of the image of 5a and the original thumbnail.

Referring now to FIG. 5a, the marked image illustrated has been compressed with JPEG compression with a quality factor of 90 to result in a compressed marked image of 2.89 bpp. To illustrate the semi-fragile technique of the present invention, the compressed, marked image of FIG. 5a is decompressed, the thumbnail extracted and the thumbnail compared to a newly computed thumbnail for the received image illustrated in FIG. 5a. The difference image between the reconstructed and newly created thumbnails is illustrated in FIG. 5b. From this difference image, the subtle changes due to image compression can be seen, but gross abnormalities are not present.

Figure 5C:
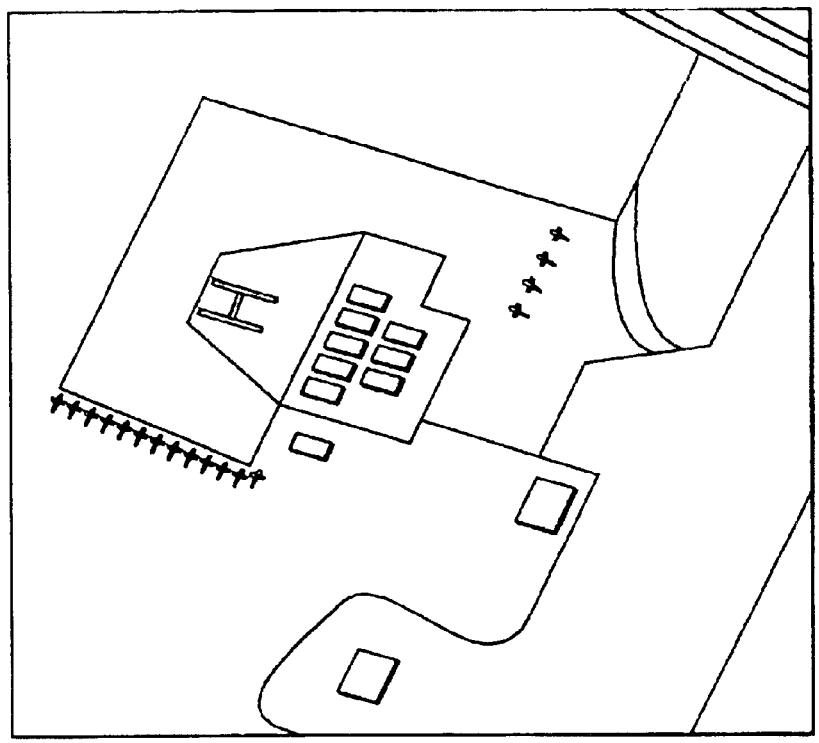
Figure 5D:
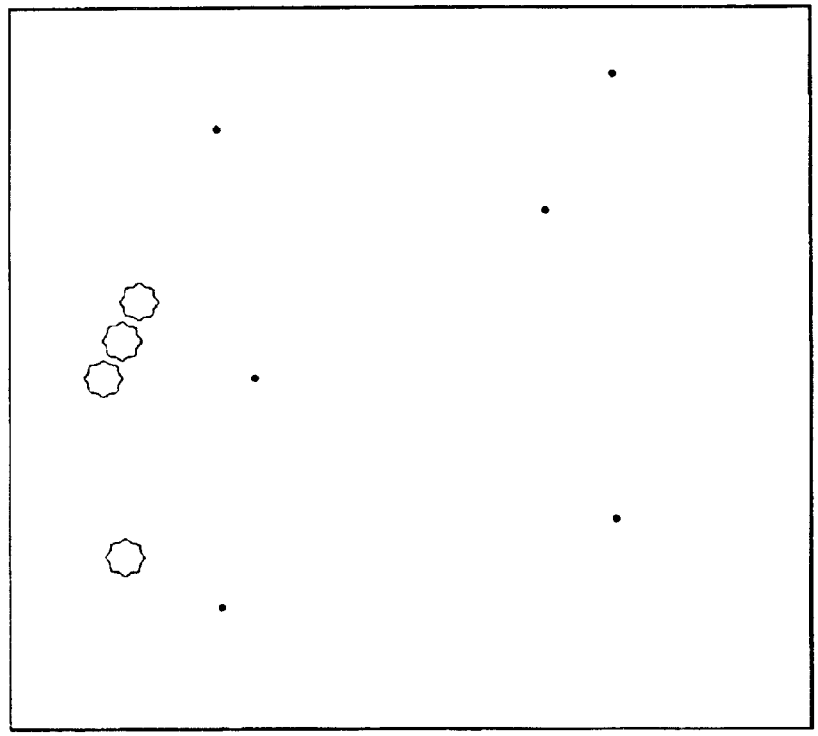
FIG. 5d illustrates results of semi-fragile tamper detection according to the present invention applied to FIG. 5c.

FIG. 5c illustrates malicious tampering by manipulating the compressed marked image of FIG. 5a by removing several planes on the tarmac and in the lower left image quadrant. FIG. 5c illustrates the received image. FIG. 5d illustrates the result of applying the semi-fragile tamper detection technique of the present invention to the modified compressed marked image of FIG. 5c. The difference between the thumbnail extracted from the received image and the newly created thumbnail for the received modified compressed image is illustrated in FIG. 5d. The significant differences between the two are evident in the clouds that occur in the locations of the removed planes. The effects of compression are still present in this difference but some are obscured by the large difference caused by the manipulation.

Figure 6:
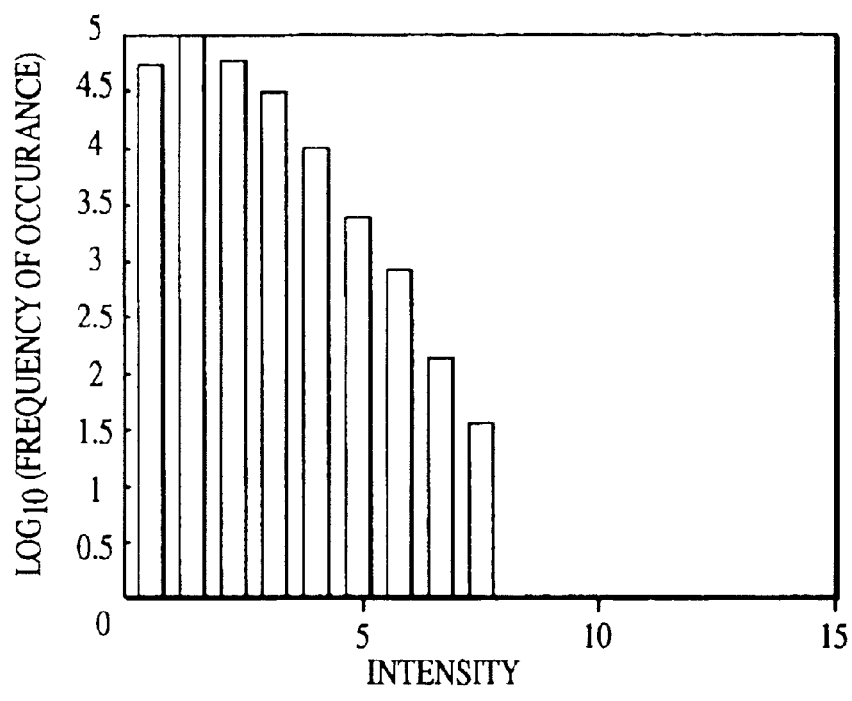
FIG. 6 illustrates a histogram of the unenhanced difference image illustrated in FIG. 5b, the compressed marked image.
Figure 7:
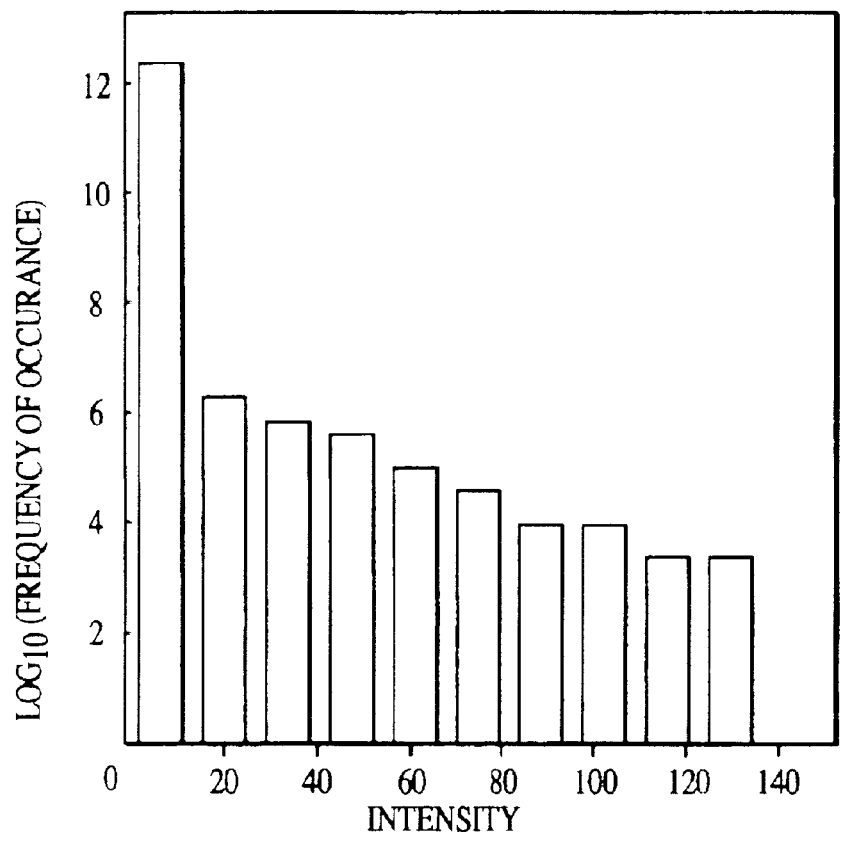
FIG. 7 illustrates a histogram of the unenhanced difference image illustrated in FIG. 5d, the modified marked image.

FIG. 6 illustrates a histogram of the difference image used to produce FIG. 5b, the compressed marked image. FIG. 7 illustrates a histogram of the difference image used to produce FIG. 5d, the modified compressed marked image. Large intensity values are present in the modified compressed marked image difference, e.g., 135, while the difference values due to lossy compression are very small, e.g., 8. As a result of this phenomenon, simple thresholding of the difference image is used in one embodiment of the present invention to provide automatic tamper detection.

Figure 8A:
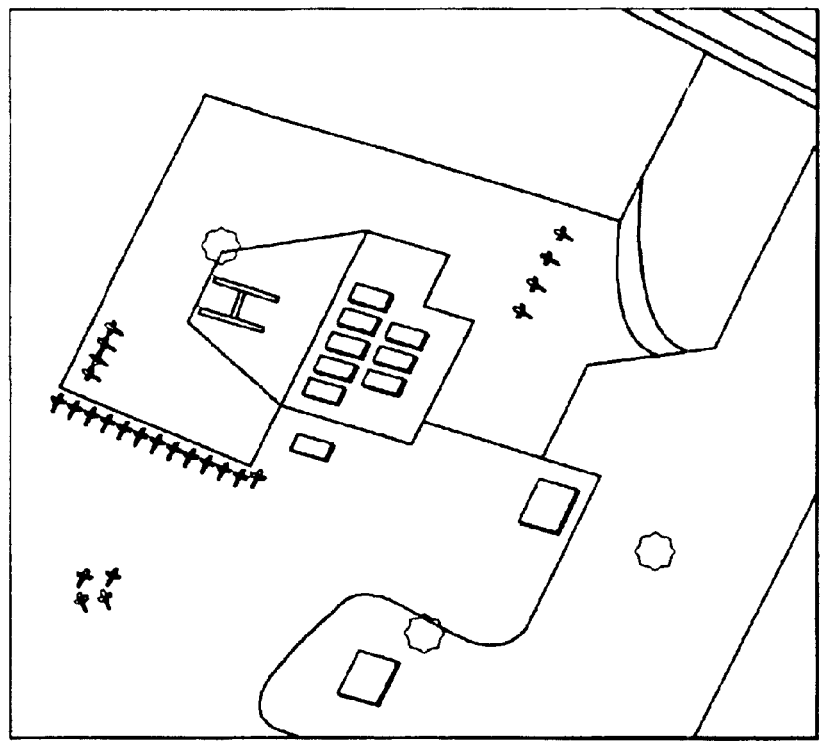
Figure 8B:
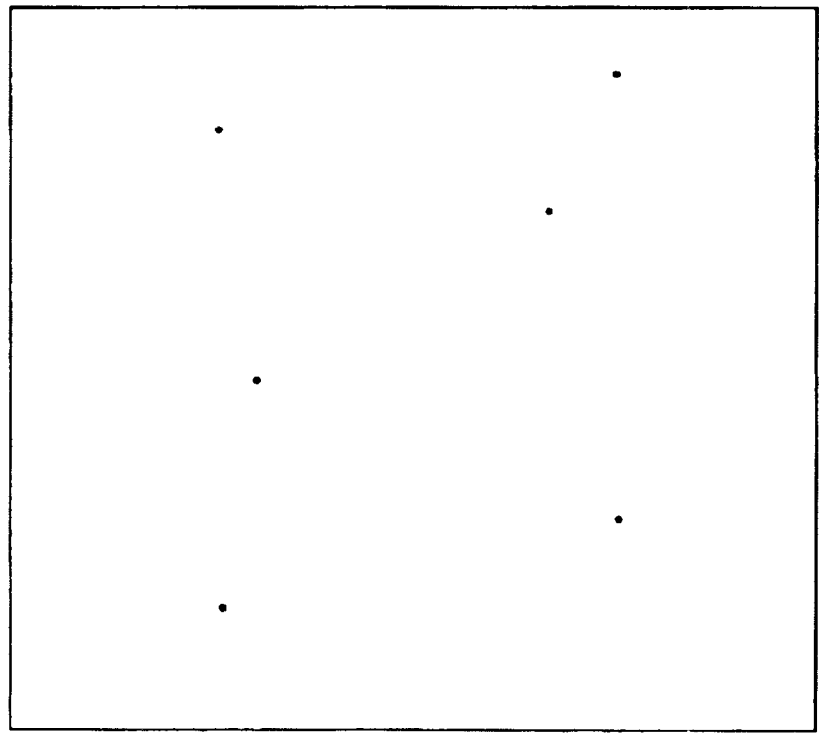
FIG. 8b illustrates the difference image of FIG. 5a and FIG. 8a, i.e., the superimposed noise.
Figure 8C:
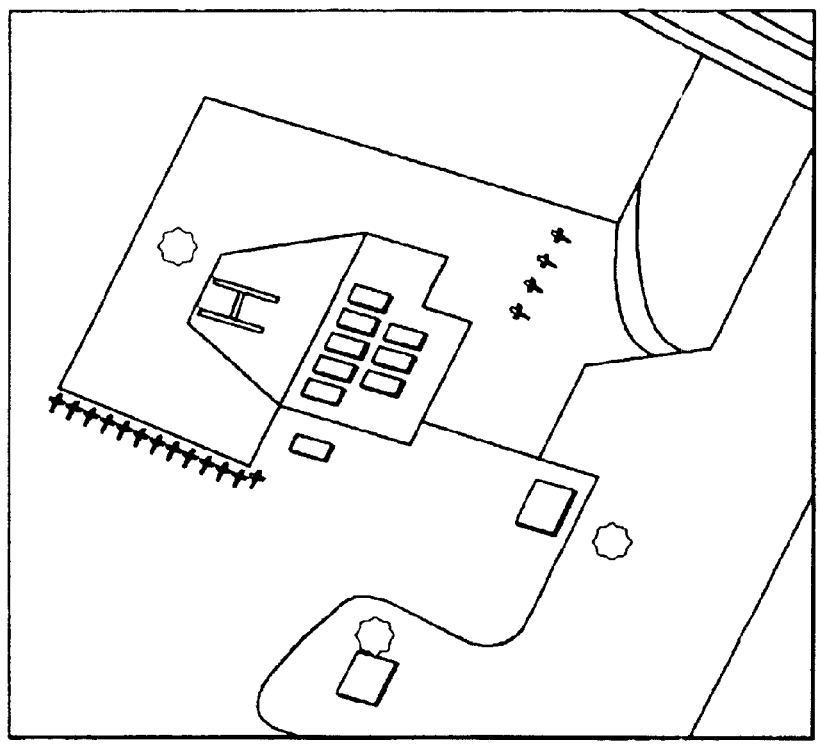
FIG. 8c illustrates the superimposition of noise on the modified marked image of FIG. 5c.
Figure 8D:
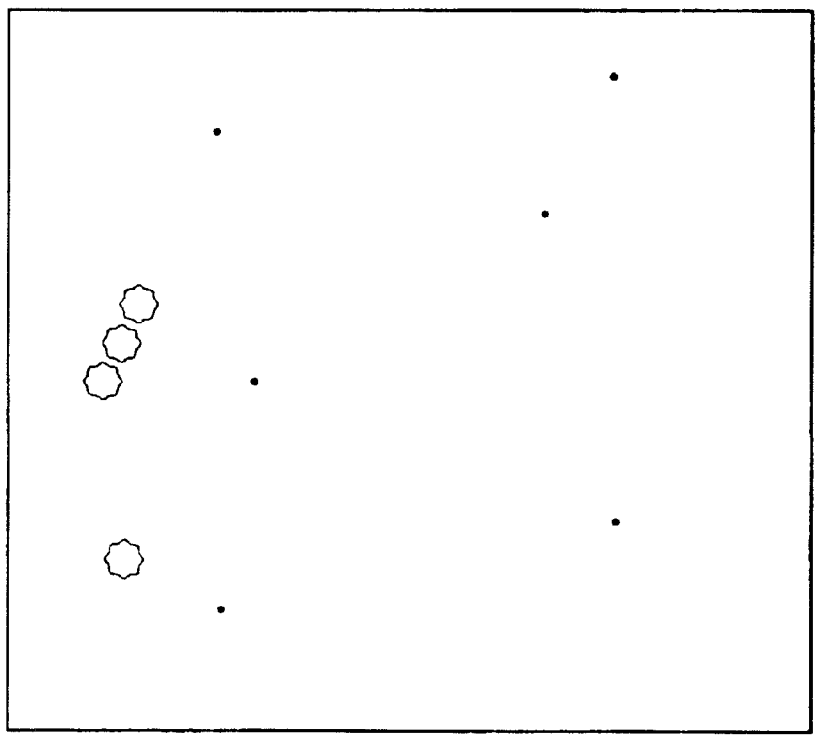
FIG. 8d illustrates the result of applying semi-fragile tamper detection according to the present invention to the image of FIG. 8c.

Finally, as illustrated in FIG. 8a, adding channel noise with a bit error rate equal to $10^{-4}$ to a marked image results in a slightly altered noisy image. The thumbnail for this marked image is extracted and compared to a newly constructed thumbnail for this image and the difference image that results is shown in FIG. 8b. When the image illustrated in FIG. 8a, a noisy marked image, is compressed and maliciously manipulated, it becomes the compressed noisy modified marked image illustrated in FIG. 8c. Applying semi-fragile tamper detection according to the present invention yields the difference image illustrated in FIG. 8d. In this difference image, noise is not readily visible while significant alterations are indicated by the clouds.

Figure 9:
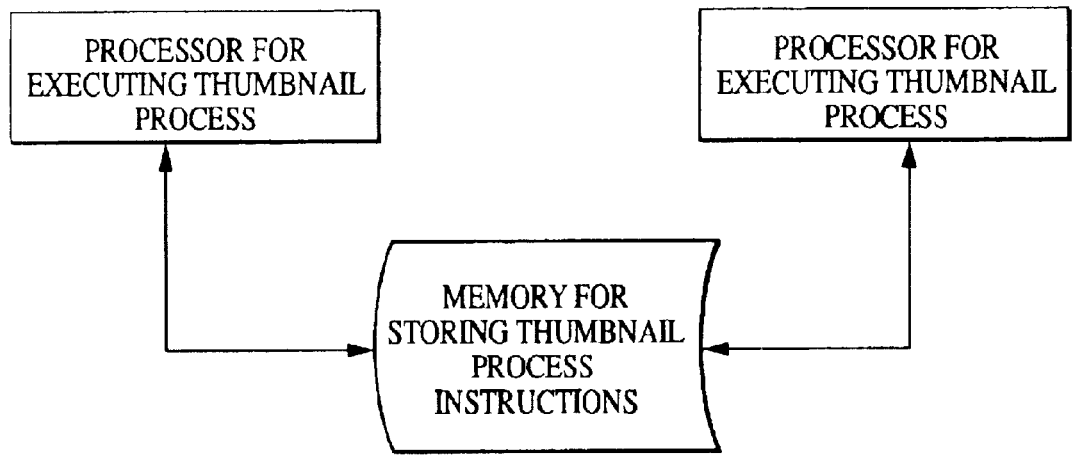
FIG. 9 is a block diagram which illustrates an embodiment of the image tamper detection according to the present invention as an apparatus.
Figure 10:
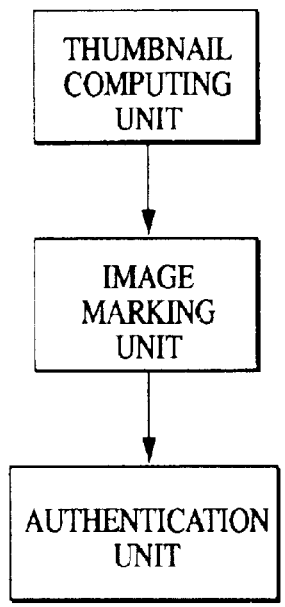
FIG. 10 is a block diagram which illustrates an embodiment of thumbnail processing according to the present invention.

From the foregoing it will be obvious to one skilled in the art that numerous modifications and variations can be made without departing from the spirit and scope of the novel aspects of the current invention. For example, FIG. 9 is a block diagram of a multiprocessor apparatus with a shared memory that embodies the thumbnail computation process of the present invention. FIG. 10 shows another example, illustrating a block diagram for an embodiment that employs individual units to perform thumbnail processing. It is to be understood that no limitation with respect to the specific embodiments illustrated is intended or should be inferred.

What is claimed is:

1. A method for image tamper detection, comprising the steps of:
    (a) computing a thumbnail of an original image;
    (b) embedding the computed thumbnail in the original image to create a marked image;
    (c) transmitting the marked image to a recipient;
    (d) extracting the embedded thumbnail from the transmitted marked image;
    (e) computing a new thumbnail of the received image;
    (f) differencing the extracted thumbnail from the new thumbnail to create a difference image that represents the similarity of the two thumbnails;
    (g) alerting if the difference image shows the two thumbnails are not sufficiently similar; and
    (h) authenticating the image if the difference image shows the two thumbnails are sufficiently similar.

2. A method for image tamper detection according to claim 1, wherein step (b) includes ensuring that the embedding does not change the size of the original image.

3. A method for image tamper detection according to claim 1, wherein step (b) includes ensuring that the embedding does not change the dynamic range of the original image.

4. A method for image taper detection according to claim 1, wherein step (b) further comprises employing a data hiding technique that is resistant to channel noise.

5. A method for image tamper detection according to claim 1, wherein step (b) further comprises employing a data hiding technique that is resistant to image compression.

6. A method for image tamper detection according to claim 5, wherein the image compression technique is JPEG.

7. A method for image tamper detection according to claim 5, wherein step (b) further comprises employing a data hiding technique that is resistant to channel noise.

8. A method for image tamper detection according to claim 1, wherein step (b) further comprises employing a data hiding technique based on Spread Spectrum Image Stenography.

9. A method for image tamper detection according to claim 1, wherein said thumbnail is defined as a low resolution version of an image.

10. A method for image tamper detection according to claim 1, wherein steps (a) and (e) further comprise employing a wavelet decomposition.

11. A method for image tamper detection according to claim 1, wherein step (g) further comprises thresholding the difference image to provide automatic detection of tampering.

12. An apparatus for image tamper detection that creates and authenticates marked images based on thumbnail processing of that image, said apparatus comprising:
    (a) a memory having instructions stored therein, said instructions being executable to perform a process of thumbnail computation; and
    (b) a processor comprising means for executing said instructions, said instruction comprising the operations of:
        (i) accepting an original image or a marked image;
        (ii) performing thumbnail processing of the accepted image
        to:
            a. derive a thumbnail of the accepted image,
            b. create a marked image from the accepted original image and said derived thumbnail, and
            c. authenticate an accepted marked image with said derived thumbnail.

13. The apparatus of claim 12, wherein said marked image is created by embedding said derived thumbnail in the accepted image.

14. The apparatus of claim 12, wherein said operation (ii)(3) includes extracting an embedded thumbnail from the accepted marked image and comparing said derived thumbnail with said embedded thumbnail for similarity.

15. A system for image tamper detection that creates and authenticates marked images based on thumbnail processing of that image, said system comprising:
    (a) means for computing a thumbnail;
    (b) means for marking an original image with said thumbnail; and
    (c) means for authenticating a marked image with said thumbnail.

16. A medium that stores instructions for image tamper detection that creates and authenticates marked images based on thumbnail processing of that image, adapted to be executed by at least one processor to perform the steps of:
    (a) accepting an original or marked image;
    (b) computing a derived thumbnail from the accepted image;
    (c) for an accepted original image, embedding the derived thumbnail into the accepted image;
    (d) for an accepted marked image, extracting an embedded thumbnail from the marked image; and
    (e) for an accepted marked image, comparing said derived thumbnail with said extracted thumbnail to determine similarity.

* * * * *